US010789957B1

(12) United States Patent
Tiwari

(10) Patent No.: US 10,789,957 B1
(45) Date of Patent: Sep. 29, 2020

(54) HOME ASSISTANT WIRELESS COMMUNICATION SERVICE SUBSCRIBER SELF-SERVICE

(71) Applicant: Sprint Communications Company L.P., Overland Park, KS (US)

(72) Inventor: Hemant V. Tiwari, Overland Park, KS (US)

(73) Assignee: Spring Communications Company L.P., Overland Park, KS (US)

( * ) Notice: Subject to any disclaimer, the term of this patent is extended or adjusted under 35 U.S.C. 154(b) by 280 days.

(21) Appl. No.: 15/887,624

(22) Filed: Feb. 2, 2018

(51) Int. Cl.
| | |
|---|---|
| *H04L 12/28* | (2006.01) |
| *G10L 17/00* | (2013.01) |
| *H04L 29/12* | (2006.01) |
| *H04L 29/06* | (2006.01) |
| *H04W 12/06* | (2009.01) |
| *H04L 29/08* | (2006.01) |

(52) U.S. Cl.
CPC ........ *G10L 17/005* (2013.01); *H04L 61/1588* (2013.01); *H04L 63/0861* (2013.01); *H04L 67/16* (2013.01); *H04W 12/06* (2013.01)

(58) Field of Classification Search
CPC ... G10L 17/005; G10L 17/22; H04L 61/1588; H04L 63/0861; H04L 67/16; H04W 12/06; H04W 12/08
See application file for complete search history.

(56) References Cited

U.S. PATENT DOCUMENTS

| | | | | |
|---|---|---|---|---|
| 8,718,242 | B2 * | 5/2014 | Bangalore | G06F 40/174 379/88.17 |
| 9,245,525 | B2 * | 1/2016 | Yeracaris | G10L 15/30 |
| 2006/0027399 | A1 * | 2/2006 | Holte | E21B 10/40 175/57 |
| 2007/0116224 | A1 * | 5/2007 | Burke | H04L 29/06027 379/201.12 |
| 2010/0185648 | A1 * | 7/2010 | Chauhan | G06F 3/167 707/769 |
| 2010/0217837 | A1 * | 8/2010 | Ansari | H04L 61/1552 709/218 |
| 2010/0330908 | A1 * | 12/2010 | Maddern | H04M 1/6058 455/41.2 |
| 2011/0111741 | A1 * | 5/2011 | Connors | H04M 1/2757 455/414.3 |
| 2014/0096004 | A1 * | 4/2014 | Zhou | G06F 16/957 715/728 |

(Continued)

*Primary Examiner* — Tongoc Tran

(57) ABSTRACT

A method of providing electronic home assistant service. The method comprises processing a first audio received from a microphone of an electronic home assistant by a voice recognition application executing on the electronic home assistant into a first parsed digital signal, providing the parsed digital signal by the voice recognition application to a plurality of applications executing on the electronic home assistant, receiving an exclusive access to parsed digital signals request by the voice recognition application from a wireless communication service account self-service client application executing on the electronic home assistant, processing a second audio received from the microphone of the electronic home assistant by the voice recognition application to form a second parsed digital signal, and providing the second parsed digital signal exclusively to the wireless communication service account self-service client application.

20 Claims, 8 Drawing Sheets

(56) References Cited

U.S. PATENT DOCUMENTS

| | | | |
|---|---|---|---|
| 2015/0277846 A1* | 10/2015 | Yen | G06F 16/957 |
| | | | 715/847 |
| 2016/0078866 A1* | 3/2016 | Gelfenbeyn | G06F 40/268 |
| | | | 704/9 |
| 2016/0173578 A1* | 6/2016 | Sharma | H04L 51/00 |
| | | | 709/203 |
| 2016/0226920 A1* | 8/2016 | Ansari | G06Q 30/04 |
| 2016/0285871 A1* | 9/2016 | Chathoth | H04L 63/0838 |
| 2018/0309645 A1* | 10/2018 | Curtis | G06F 40/279 |
| 2018/0330589 A1* | 11/2018 | Horling | G08B 25/008 |
| 2018/0337799 A1* | 11/2018 | Levi | G06F 3/167 |
| 2019/0141031 A1* | 5/2019 | Devdas | H04L 63/0807 |
| 2019/0206412 A1* | 7/2019 | Li | G10L 15/22 |

* cited by examiner

HOME ASSISTANT WIRELESS COMMUNICATION SERVICE SUBSCRIBER SELF-SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Home assistants are a kind of consumer electronic device that interacts with human beings using oral communications based on a voice recognition system (VRS) that is provided by the home assistant. The home assistant may be communicatively coupled to a communication network, for example the Internet, and undertakes a variety of tasks requested orally by the human user. For example, the home assistant may be communicatively coupled to other electronic devices in a residence such as to a sound system, and the human may orally request the home assistant to mute music presentation and unmute music presentation. The home assistant may undertake an information search on the Internet on behalf of the human, in response to an oral command or request, and present the results of the search over speakers as an audible voice.

SUMMARY

In an embodiment, an electronic home assistant is disclosed. The electronic home assistant comprises a processor, a non-transitory memory, a microphone, a Bluetooth radio transceiver that receives a pairing request from a mobile communication device, a network interface, a voice recognition application stored in the non-transitory memory that, when executed by the processor, processes audio received from the microphone and parses the audio into a parsed digital signal, and a self-service client application stored in the non-transitory memory. When executed by the processor, after the Bluetooth pairing request is received by the Bluetooth radio from the mobile communication device, the self-service client application determines an identity of the mobile communication device, determines a wireless communication service provider associated with the mobile communication device, and transmits a subscriber self-service registration request message comprising the identity of the mobile communication device via the network interface to a self-service server application executing on a server computer. The self-service client application further receives the parsed digital signal from the voice recognition application that comprises the one-time use security token, transmits the one-time use security token via the network interface to the self-service server application, whereby the self-service client application registers the mobile communication device with the self-service server application, receives a bundle of notifications from the self-service server application via the network interface, where the bundle of notifications pertain to the wireless communication service account associated with the mobile communication device, and causes the notifications to be audibly presented.

In another embodiment, a method of providing electronic home assistant service is disclosed. The method comprises parsing a first audio received from a microphone of an electronic home assistant by a voice recognition application executing on the electronic home assistant to generate a first parsed digital signal, providing the parsed digital signal by the voice recognition application to a plurality of applications executing on the electronic home assistant, receiving an exclusive access to parsed digital signals request by the voice recognition application from a wireless communication service account self-service client application executing on the electronic home assistant, parsing a second audio received from the microphone of the electronic home assistant by the voice recognition application to generate a second parsed digital signal, and providing the second parsed digital signal by the voice recognition application exclusively to the wireless communication service account self-service client application. The method further comprises establishing a virtual private network (VPN) connection by the wireless communication service account self-service client application via a network interface of the electronic home assistant service to a self-service server application executing on a server computer in a network operated by a wireless communication service provider and transmitting a self-service message comprising confidential information derived from the second parsed digital signal by the wireless communication service account self-service client application via the VPN to the self-service server application.

In yet another embodiment, an electronic home assistant is disclosed. The home assistant comprises a processor, a non-transitory memory, a microphone, a Bluetooth radio transceiver that receives a pairing request from a mobile communication device, a network interface, a voice recognition application stored in the non-transitory memory that, when executed by the processor, processes audio received from the microphone and parses the audio into a parsed digital signal, and a self-service client application stored in the non-transitory memory. When executed by the processor, after the Bluetooth pairing request is received by the Bluetooth radio from the mobile communication device, the self-service client application determines an identity of the mobile communication device, determines a wireless communication service provider associated with the mobile communication device, transmits a subscriber self-service registration request message comprising the identity of the mobile communication device via the network interface to a self-service server application executing on a server computer, and receives a parsed digital signal from the voice recognition application that comprises a one-time use security token. The self-service client application further transmits the one-time use security token via the network interface to the self-service server application, whereby the self-service client application registers the mobile communication device with the self-service server application, receives a security token and a bundle of notifications from the self-service server application via the network interface, where the bundle of notifications pertain to a wireless communication service account associated with the mobile communication device, and causes the notifications to be audibly presented, stores an association between the security token, the identity of the mobile communication device, and an identity of a Bluetooth radio transceiver of the mobile communication device in the non-transitory memory. The self-service client application further determines that the Bluetooth radio transceiver has repaired with the Bluetooth radio transceiver of the mobile communication device, based on the identity of the Bluetooth radio transceiver of the mobile communication device, reads the security token from the non-transitory memory, after reading the security token from the non-transitory memory, transmits a notification request message comprising the security token to the self-service server application, receives a second bundle of notifications from the self-service server application via the network interface, and causes notifications received in the second bundle of notifications to be audibly presented.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
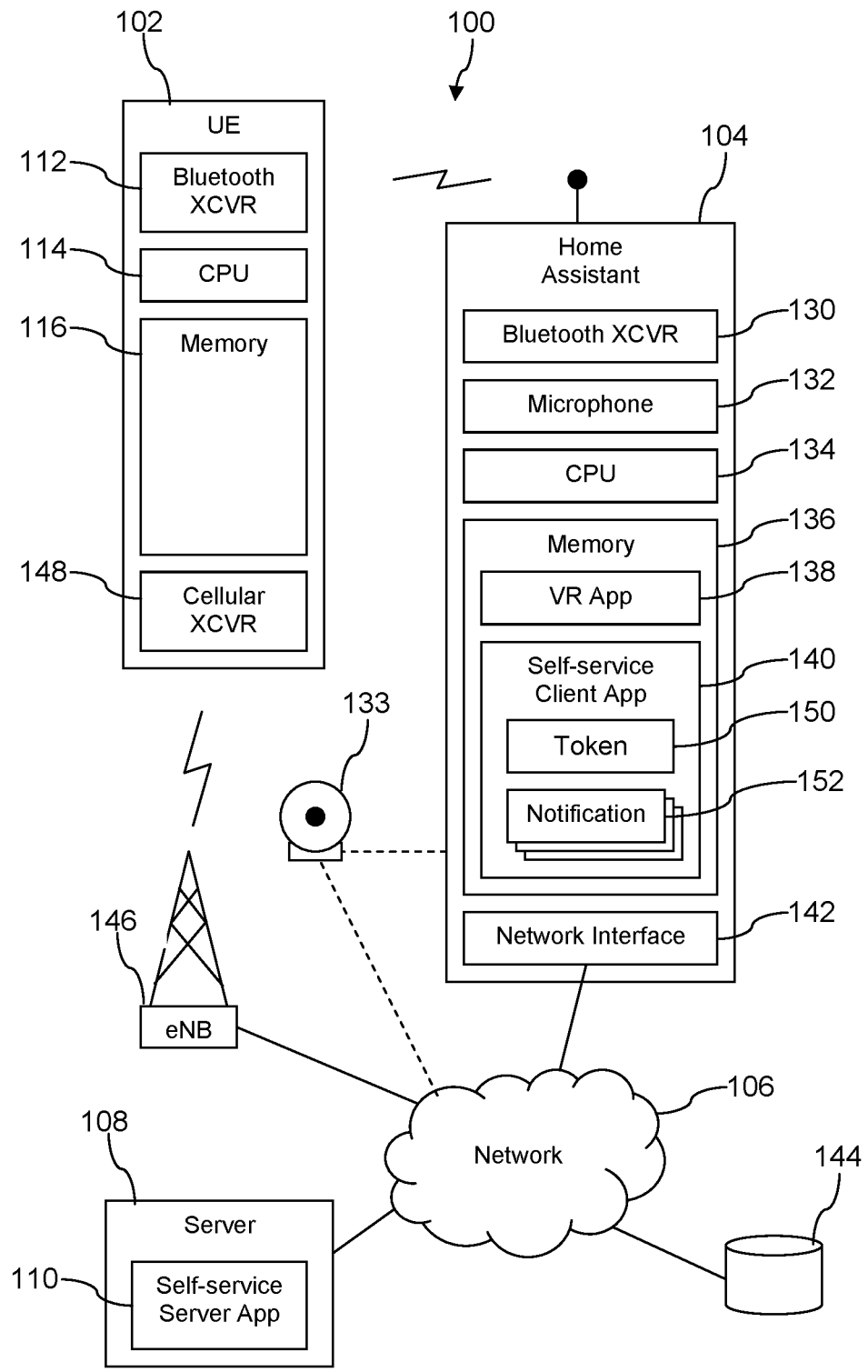
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Electronic home assistants are becoming more commonly deployed in private residences and other environments. The present disclosure teaches integrating a wireless communication subscriber self-service client application in a home assistant to promote ease of a wireless subscriber maintaining his or her wireless communication subscription account. The enhanced home assistant disclosed herein reduces friction between the subscriber and the wireless communication service provider, making it easier to pay bills timely and more difficult to forget about payment deadlines. The self-service client application in the home assistant can provide timely reminders to the subscriber and initiate various subscription account transactions, such as paying a bill, adding a premium subscription service, upgrading a mobile communication device, and other related wireless communication subscription transactions. The home assistant can also provide some layers of security that become desirable when providing these kinds of wireless communication self-service actions. For example, the wireless communication self-service client application and/or the home assistant may be able to distinguish between different human voices in the same environment and provide differentiated responses to the different humans based on distinguishing their voices. When the home assistant detects the subscriber—either by dint of detecting the subscriber's mobile communication device or recognizing the subscriber's voice, the self-service client application can take action accordingly.

The home assistant and/or a wireless communication self-service client application executing on the home assistant can detect when a mobile communication device initiates Bluetooth pairing with the home assistant. On an initial Bluetooth pairing, the wireless communication self-service client application may determine information about the mobile communication device and/or the subscriber. For example, the wireless communication self-service client application may initiate a self-service registration process with the subscriber using the aural capabilities of the home assistant. The wireless communication self-service client application may invite the subscriber to provide registration information. A voice recognition application executing on the home assistant may parse audio received by a microphone of the home assistant (the human subscriber verbally replying to the oral invitation to register) and provide parsed audio (words) or other digital signal representing the audio voice to the wireless communication self-service client application. The parsed audio output by the voice recognition application may be referred to as a parsed digital signal in some contexts. The wireless communication self-service client application may initiate a communication session over a network interface of the home assistant to a self-service server application executing on a server computer in the domain of the wireless communication service provider that the mobile communication device receives wireless service from. The wireless communication self-service client application may provide information identifying the mobile communication device to the self-service server application in a self-service registration request message via the communication session.

The self-service server application may generate a one-time use security token that it transmits to the mobile communication device independently of the home assistant, for example via a short message service (SMS) message or an email. The self-service server application may also store a copy of the one-time use security token in server memory. The wireless communication self-service client application on the home assistant may prompt the subscriber, via an oral message delivered via the voice recognition application, to retrieve the one-time use security token from the mobile communication device and speak the token aurally. The voice recognition application may parse the audio of the human voice response received via the microphone of the home assistant and provide the parsed words, the parsed digital signal, or other digital signal representing the audio comprising the one-time use security token to the wireless communication self-service client application.

The wireless communication self-service client application may transmit the one-time use security token via the communication session to the self-service server application. The self-service server application may verify that the returned one-time use security token matches the one-time use security token it sent through the alternate communication channel (i.e., text message or email). For example, the self-service server application may read the corresponding one-time use security token it stored in server memory and compare it to the one-time use security token it received from the wireless communication self-service client application. This verification process may further include performing related checks, such as comparing a current time to a timestamp embedded in the one-time use security token sent to the mobile communication device and if the time difference exceeds a predefined time interval rejecting the establishment of the session. The self-service server application may further mark the one-time use security token as invalid in memory after the one-time use or may delete the one-time use security token from memory.

The self-service servicer application may bundle one or more notifications related to the wireless communication service account of the subscriber along with an authentication token and send this bundle to the wireless communication self-service client application executing on the home assistant. The wireless communication self-service client application stores the authentication token in a non-transitory memory of the home assistant for future use in automatically initiating communication sessions with the self-service servicer application. The wireless communication self-service client application may further provide one or more notifications received in the bundle, to be presented orally via the voice recognition application. A notification may indicate that a subscription payment is due or is overdue. A notification may indicate that the subscriber is eligible for a device upgrade in two months. A notification may provide a recommendation of an upgrade device, in view of an approaching upgrade eligibility date. A notification may provide an offer to upgrade a communication subscription service by adding premium communication services. Other notifications may be of a public service nature or of a nature to share information with the subscriber that correlates with an interest profile of the subscriber. In presenting the notifications to the user, the wireless communication self-service client application may initiate an oral dialog with the user via the voice recognition application, inviting the subscriber to initiate some action or transaction that the wireless communication self-service client application would mediate on behalf of the subscriber.

The wireless communication self-service client application may periodically initiate a communication session with the self-service servicer application to obtain notification updates. In an embodiment, the wireless communication self-service client application or the home assistant can detect the presence of the mobile communication device of the subscriber, for example based on detecting a Bluetooth signal and/or a Wi-Fi signal emitted by the mobile communication device. The detected presence of the subscriber may be a trigger that causes the wireless communication self-service client application to open the communication session to obtain notification updates. The detected presence of the subscriber may be a trigger to cause the wireless communication self-service client application to cause newly received notifications to be orally presented to the subscriber.

It is noted that the wireless communication self-service client application described here is capable of distinguishing different mobile communication devices and providing the described self-service functionality to either or both devices independently. The different mobile communication devices may be associated with the same wireless communication service provider and the same service account (e.g., different mobile communication devices used by different family members on a family wireless plan), associated with the same wireless communication service provider but on different service accounts, or associated with different wireless communication service providers and different service accounts.

In making payments, the subscriber may rely upon the wireless communication self-service client application using a payment card on record with the home assistant. Alternatively the subscriber may initiate a payment transaction orally with the wireless communication self-service client application, for example to use a payment vehicle different from the payment card on record with the home assistant. In an embodiment, the home assistant may have a near field communication (NFC) radio transceiver and be configured to complete smart card payment transactions or NFC payment transactions, with either a NFC radio transceiver installed in a mobile communication device or with a smart card or debit card.

It may be desirable for a payment transaction, or other sensitive transactions, to be conducted with enhanced security. The present disclosure teaches the home assistant supporting a virtual private mode (VPM) of operation where the wireless communication self-service client application requests exclusive access to parsed audio temporarily, whereby sharing of the parsed audio (words) with other applications executing on the home assistant is temporarily suspended. The wireless communication self-service client application can further establish a classic VPN connection via the network interface of the home assistant to the self-service server in the wireless communication service provider domain or to another server computer to complete the sensitive transaction. Alternatively, the wireless communication self-service client application can use some other heightened security communication channel, different from a classic VPN connection, to complete the sensitive transaction, for example by exchanging encrypted messages with the self-service server application or with a different server computer. When the transaction is complete, the wireless communication self-service client application executing on the home assistant can release the exclusive access to the parsing of the audio by the voice recognition application.

The VPM and VPN operations described above also can be applied, if desired, in the self-service registration process to complete the initial registration of the mobile communication device with the self-service client application. When the self-service client application initiates the self-service registration process, it may initiate the VPM mode (e.g., obtain exclusive access to parsed audio of the home assistant), receive the spoken registration information, initiate a VPN with the self-service server application, and send the self-service registration request message described above over the VPN to the self-service server application. The self-service server application may send the one-time use security token to the mobile communication device, and the self-service client application may receive the one-time use security token as spoken audio while the home assistant grants it exclusive use of audio in the VPM mode. The self-service client application can then send this one-time use security token back to the self-service server application via the VPN. The self-service server application can return the authentication token and any pending notifications back to the self-service client application via the VPN, thereby completing the self-service registration process. This use of the VPM and VPN during the self-service registration process can make this process more secure and less vulnerable to hacking. At the end of the self-service registration process, the self-service client application can release the VPM (e.g., release exclusive access to the parsed of the home assistant) and turn down the VPN.

A range of new and useful services of home assistants have been described above and are described in more detail hereinafter. These features or functions may be deployed separately in different home assistants or various combinations of these features can be deployed in the same home assistant product. These new services or features can increase the penetration of the electronic home assistant product and improve the lives of people generally.

Turning now to FIG. 1, a system 100 is described. In an embodiment, system 100 comprises a mobile communication device 102 (user equipment—UE), an electronic home assistant 104, a network 106, and a self-service self-service server 108 executing a wireless communication self-service server application 110. The mobile communication device 102 is one of a mobile phone, a smart phone, a personal digital assistant (PDA), a wearable computer, a headset computer, a media player, a laptop computer, a notebook computer, or a tablet computer. The network 106 comprises one or more public network one or more private network, or a combination thereof. The home assistant 104 and the self-service self-service server 108 may be implemented as computer systems. Computer systems are described further hereinafter.

The home assistant 104 may offer a variety of concierge-like services for a human being using an audio interface mediated by a voice recognition application 138. The home assistant 104 and/or the voice recognition application 138 monitors sound proximate to the home assistant 104 via a microphone 132 of the home assistant 104. A human being proximate to the home assistant 104 may orally speak a request, using his or her voice and native language, to be fulfilled by the home assistant 104. The voice recognition application 138 may process the sounds captured by the microphone 132 and parse them into words or digital signals that are intelligible to applications executing on the home assistant. These digital signals intelligible to applications may be referred to as parsed digital signals. The parsed audio or parsed digital signal may comprise digital representations of words. The parsed audio or parsed digital signal may comprise a different digital representation of the original audio that is amenable to algorithmic processing by applications executing on the processor 134 of the home assistant 104. The voice recognition application 138 may provide the parsed digital signals to a plurality of applications executing, at least in a background mode, on the home assistant 104. One of the applications executing in background mode may accept responsibility to fulfill the spoken request, begin execution in foreground mode, fulfill the request, and return to a background mode of execution. In some cases, the fulfillment of the spoken request may entail the responsible application initiating communications via a network interface 142 of the home assistant 104 to the network 106 and there through to an application server (not shown) or a content server (not shown).

The mobile communication device 102 may comprise a Bluetooth radio transceiver 112, a processor 114, and a memory 116. The memory 116 may comprise a non-transitory portion as well as a transitory portion. The mobile communication device 102 further comprises a cellular radio transceiver 148. The home assistant 104 may comprise a Bluetooth radio transceiver 130, the microphone 132, a processor 134, a memory 136, and the network interface 142. The memory 136 may comprise a non-transitory portion as well as a transitory portion. The non-transitory portion of the memory 136 comprises a wireless communication self-service client application 140 that is referred to hereinafter as the self-service client application 140 in view of concision.

In an embodiment, the home assistant 104 may comprise a speaker 133 that is integrated into the home assistant 104. Alternatively, the speaker 133 may be located in an environment proximate to the home assistant 104 and communicatively linked to the home assistant 104 either wirelessly or wired via the network 106. The home assistant 104 presents audio to a human user of the home assistant 104 via the speaker 133, for example plays back a voice message to the human being over the speaker 133.

When the mobile communication device 102 approaches the home assistant 104 (e.g., a user of the home assistant 104 enters his or her home), the Bluetooth radio transceiver 112 of the device 102 may pair with the Bluetooth radio transceiver 130 of the home assistant 104. It may be that the subscriber associated with the mobile communication device 102 has had the self-service client application 140 recently installed on the home assistant 104 and follows initiation instructions provided for the self-service client application 140 that call for the user to pair the Bluetooth radio transceiver 112 of the device 102 to the Bluetooth radio transceiver 130 of the home assistant 104 to launch a self-service registration process.

The self-service client application 140 may initiate a registration dialog with the subscriber via the voice recognition application 138. The self-service client application 140 may request the subscriber to speak an identity of the mobile communication device 102, for example a mobile directory number (MDN) or phone number of the subscriber, a mobile equipment identity (MEID) of the phone, the name of the subscriber, or another identity. The self-service client application 140 may request the subscriber to speak an identity of a wireless communication service provider that provides wireless communication services for the mobile communication device 102. The subscriber speaks the requested identity, the microphone 132 receives the spoken identity, the voice recognition application 138 parses the signal received from the microphone 132 and converts it into a digital signal intelligible to applications (i.e., a parsed digital signal) executing on the home assistant 104, and the self-service client application 140 captures the subscriber identification information. The self-service client application 140 sends a self-service registration request message containing the subscriber identification information to the wireless communication self-service server application 110, which is hereafter referred to as the self-service server application 110, via the network interface 142 and the network 106. In an embodiment, the self-service client application 140 may send self-service registration request messages to different self-service servers 108 and self-service server applications 110 for mobile communication devices 102 that receive wireless communication service from different wireless communication service providers. Alternatively, the self-service server application 110 and self-service self-service server 108 may support wireless subscription account self-service functions on behalf of a plurality of different wireless communication service providers. Alternatively, the self-service serve application 110 and self-service self-service server 108 and the self-service client application 140 may cooperatively provide a proprietary service which is operable only for a single wireless communication service provider.

In response to receiving the self-service registration request message, the self-service server application 110 searches a wireless communication service provisioning data store 144 to confirm that the mobile communication device 102 has a subscription account. The self-service server application 110 then generates a one-time use security token. The one-time use security token may comprise a string of symbols that are randomly selected by the self-service server application 110. The self-service server application 110 may also store the one-time use security token in a memory of the self-service self-service server 108. The self-service server application then sends this one-time use security token to the mobile communication device 102 via a communication channel independent of the home assistant 104. For example, the self-service server application 110 sends the one-time use security token via a cell site 146 over a wireless communication link to the cellular radio transceiver of the mobile communication device 102, for example via a short message service (SMS) message, via an email, or via some other communication service. The cell site 146 may provide a wireless communication link to the cellular radio transceiver 148 according to one of a long term evolution (LTE), a code division multiple access (CDMA), a global system for mobile communication (GSM), or a worldwide interoperability for microwave access (WiMAX) wireless communication protocol.

The self-service client application 140 may orally request the subscriber to retrieve the one-time use security token from the mobile communication device 102 and speak the content of the one-time use security token. The microphone 132 receives the spoken audio of the one-time use security token, the voice recognition application 138 parses the signal received from the microphone 132 and converts it into a digital signal intelligible to applications (i.e., a parsed digital signal) executing on the home assistant 104, and the self-service client application 140 captures the one-time use security token. The self-service client application 140 sends the one-time use security token to the self-service server application 110 via the network interface 142 and the network 106.

The self-service server application 110 validates the one-time use security token received from the self-service client application 140. It may first determine if the one-time use security token is active, for example is stored in a memory of the self-service server 108. It may check a subscriber identity bundled with the one-time use security token received from the self-service client application 140 to a subscriber identity associated with the one-time use security token as stored in a memory of the self-service server 108. It may compare a timestamp associated with the security token with a current time and if the time difference is too great (i.e., the one-time use security token may have a time-to-live value associated with it) the registration may be rejected.

If the one-time use security token received from the self-service client application 140 is validated, the self-service server application 110 generates a security token, stores the security token in memory of the self-service server 108 associated with the self-service client application 140 and/or the subscriber associated with the mobile communication device 102, and collects notifications pertinent to the subscriber associated with the mobile communication device 102 who has just completed registration for wireless communication self-service through the home assistant 104 and the self-service client application 140. The self-service server application 110 bundles the notifications and the security token and sends this bundle to the self-service client application 140 via the network 106 and the network interface 142 of the home assistant 104.

The self-service client application 140 may store the security token 150 and the notifications 152 in the non-transitory portion of the memory 136. In an embodiment, the self-service server application 110 marks the one-time use security token stored in memory of the self-service server 108 as already used, which prevents its being presented a second time for self-service registration. In another embodiment, the self-service server application 110 deletes the one-time use security token after its use to register the subscriber associated with the mobile communication device 102 to access wireless communication service account self-service functionality mediated by the self-service client application 140, whereby the one-time use feature is enforced. It is noted that the security token 150 is different from the one-time use security token described earlier in that it is not configured to be used only one time but potentially a plurality of times. While the security token 150 may be associated with a time-to-live property or a delimited number of uses restriction that in time leads to the invalidation of the security token 150, it may be used a plurality of times, as described further below.

The self-service client application 140 may orally present the notifications 152 to the subscriber, for example send the notifications 152 in a format understandable by the voice recognition application 138, and the voice recognition application 138 may play back the notifications 152 in spoken voice via the speaker 133. The notifications 152 may notify the subscriber of an overdue subscription account payment, an approaching payment deadline for subscription account payment, an approaching eligibility for device upgrade, a recommendation of an upgrade device that may be suitable to the subscribers communication and device use patterns, an offer for a discounted price to initiate a new premium communication service on the device 102, or other notification. The notifications may pertain to a special interest associated with the subscriber. The notifications may pertain to public interest information such as approaching inclement weather or signal community events like the resumption of school sessions, a city-sponsored event, or other event.

The functionality described above of self-service for a single mobile communication device 102 can also be provided by the home assistant 104 and/or the self-service client application 140 in a similar way for two or more mobile communication devices 102 linked by a shared wireless communication service account, for example different users on a single family plan or on a single employer sponsored plan. Each different user can conduct a registration session with the self-service client application 140 in a like manner and a different security token associated with each different user and/or mobile communication device 102 can be obtained and stored by the self-service client application 140. The self-service client application 140 can obtain notifications directed to each different user and play them back for that specific user to hear. In an embodiment, this functionality may be supported in a like manner when different users associated with distinct service accounts register through the same home assistant 104 and/or self-service client application 140 for subscriber self-service functionality, even if the different users are provided wireless communication services by different wireless communication service providers.

Figure 2:
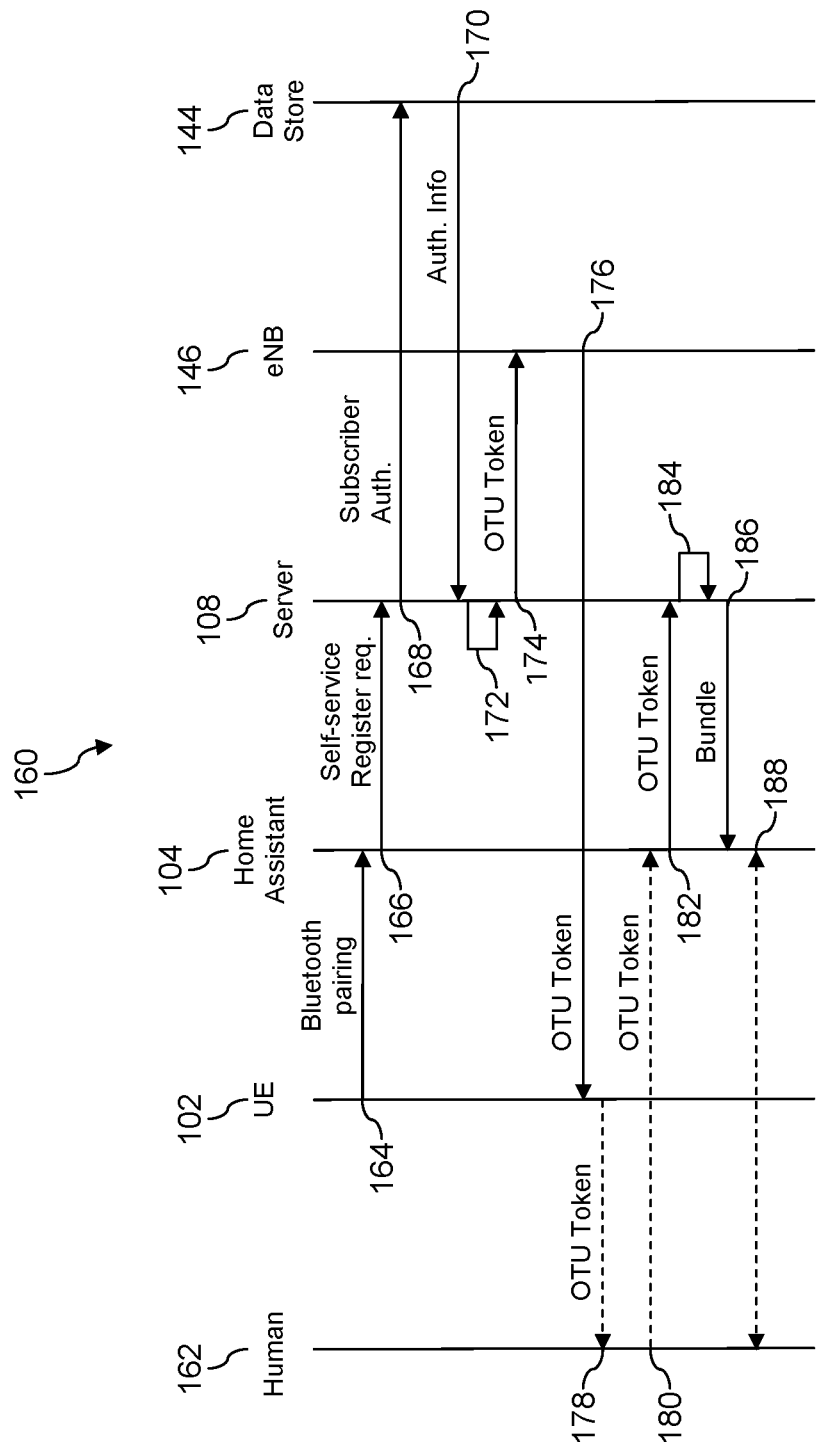
FIG. 2 is a message sequence diagram according to an embodiment of the disclosure.

Turning now to FIG. 2, a message sequence diagram 160 is described. The message sequence diagram 160 is consistent with the description of the wireless communication subscriber self-service registration process described above. The mobile communication device 102 completes Bluetooth pairing 164 with the home assistant 104. The home assistant 104 and/or the self-service client application 140 sends a self-service registration request message 166 to the self-service server 108. The self-service server 108 and/or the self-service server application 110 sends a subscriber authentication request message 168 to the provisioning data store 144. The provisioning data store 144 returns authentication information in response 170 to the authentication request message.

The self-service server 108 and/or the self-service server application 110 generates 172 a one-time use (OTU) token. Generating 172 the one-time use security token may involve generating a random string of symbols and attaching a time-to-live value to the random string of symbols and storing the one-time use security token in a memory of the self-service server 108. The self-service server 108 and/or the self-service server application 110 sends the one-time use security token to the mobile communication device 102 through an independent communication channel (independent of the communication channel from the self-service client application 140 and the home assistant 104). This independent communication channel may be using short message service (SMS) text message, a multimedia message service (MMS) message, an email, or other communication protocol. The self-service server 108 and/or the self-service server application 110 sends 174 the one-time use security token to a cell site 146, and the cell site 146 sends 176 the one-time use security token to the mobile communication device 102.

The mobile communication device 102 presents 178 the one-time use security token to the subscriber, for example presents the string of symbols randomly generated by the self-service server application 110 on a display screen of the device 102. A human 162 reads 178 the one-time use security token and speaks 180 the one-time use security token (speaks the string of characters out loud proximate to the home assistant 104 and the microphone 132). The voice recognition application 138 parses the spoken audio into a parsed digital signal suitable for use by the self-service client application 140, where the parsed digital signal contains the one-time use security token. The home assistant 104 and/or the self-service client application 140 sends 182 the one-time use security token to the self-service server 108 and/or the self-service server application 110.

The self-service server application 110 validates 184 the one-time use security token and builds a security token. The security token may comprise a string of characters randomly generated by the self-service server application 110, in a way similar to the generation of the one-time use security token. The security token may comprise a time-to-live value or a maximum number of uses value, such that the security token is deemed invalid after the expiration of the time-to-live or after the token has been used the predefined maximum number of times. The self-service security application 110 stores the security token in a memory of the self-service server 108 associated with the mobile communication device 102 and/or associated with the user of the device 102.

The self-service server application 110 builds a bundle of notifications relevant to the subscriber associated to the mobile communication device 102 and adds the security token to this bundle. The self-service server 108 and/or the self-service server application sends 186 the bundle to the home assistant 104 and/or the self-service client application 140. The self-service client application 140 presents 188 the notifications received in the bundle to the human 162, for example speaking the content of the notifications over the speaker 133 communicatively coupled to the home assistant 104. This presentation of notifications may comprise two-way oral communication between the human 162 and the home assistant 104 and/or the self-service client application 140, for example in conducting transactions depending on a sequence of choices and inputs from the human 162.

The self-service client application 140 may close the communication session with the self-service server application 110 after receiving the security token 150 and notifications 152. The self-service client application 140 may periodically reestablish a communication session with the self-service server application 110 by sending a communication session request message including the security token 150. For example, the self-service client application 140 may establish a communication session with the self-service server application 110 hourly, daily, weekly, or some other periodic interval of time to receive any self-service notifications that have been queued for the subscriber associated with the mobile communication device 102.

Figure 3:
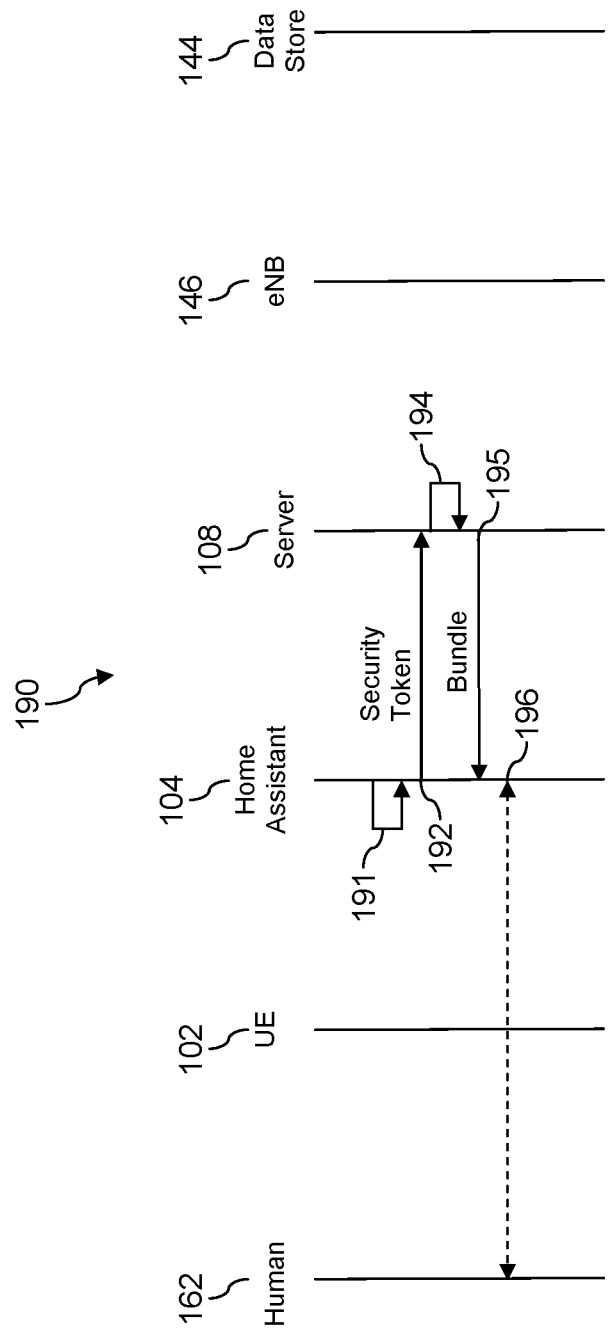
FIG. 3 is another message sequence diagram according to an embodiment of the disclosure.

Turning now to FIG. 3, a message sequence 190 is described. The message sequence 190 is consistent with the description above. The home assistant 104 and/or the self-service client application 140 looks up 191 the security token 150 in the memory 136 of the home assistant 104. The home assistant and/or self-service client application 140 sends 192 the security token to the self-service server 108 and/or the self-service server application 110. The self-service server application 110 validates 194 the security token. Validating the security token may involve looking up the security token stored in the memory of the self-service server 108, for example using an identity of the mobile communication device 102 or an identity of the user of the device 102 as a key to the stored security token. Validating the security token further comprises comparing the value of the stored security token to the received security token and assuring that they match. In an embodiment, validating the security token may further comprise determining that the time-to-live of the security token has not expired or that the maximum number of uses constraint on the security token has not been exceeded.

When the security token has been validated, the self-service server application identifies any queue notifications intended for the subscriber associated with the mobile communication device 102 and sends 195 a bundle of queued notifications to the home assistant 104 and/or the self-service client application 140. The self-service client application 140 and/or the home assistant presents these notifications to the human 162. It is understood that the processing of sequence diagram 190 may repeat periodically.

It is understood that the security token may be used multiple times to initiation a communication session between the self-service client application 140 and the self-service server application 140 but after a time-to-live of the security token expires or a maximum number of uses of the security token have occurred, the validation 194 may fail. At this point, a security token invalid message may be returned to the home assistant 104 and/or the self-service client application 140, and the home assistant 104 and/or the self-service client application 140 may repeat the processing described with reference to FIG. 1 and with reference to FIG. 2 above. Said in other words, the user associated with the mobile communication device 102 may occasionally be prompted to re-register for wireless subscriber self-service functionality, as the security token 150 expires.

In an embodiment, the self-service client application 140 may retrieve queued self-service notifications and pend them in the memory 136 of the home assistant 104 when the mobile communication device 102 is not nearby. The mobile communication device 102 may be deemed "away" if the known Bluetooth identity of the Bluetooth radio transceiver 112 is not detected by the Bluetooth radio transceiver 130 of the home assistant 104. Alternatively, the mobile communication device 102 may also be associated with a Wi-Fi radio identity and this may be stored by the self-service client application 140 in the non-transitory portion of the memory 136 for use as a proxy for the presence of the device 102. For example, the Bluetooth radio transceiver 112 of the mobile communication device 102 may be turned off while its Wi-Fi radio transceiver is turned on. If the Bluetooth identity of the Bluetooth radio transceiver 112 of the device 102 and a Wi-Fi radio transceiver identity of the device 102 is not present in the radio environment of the home assistant 104, the mobile communication device 102 may be deemed "away."

When the mobile communication device 102 is determined to have returned to the proximity of the home assistant 104, for example by detecting the presence of the Bluetooth radio transceiver 112 of the device 102 or a Wi-Fi radio transceiver of the device 102, the self-service client application 140 may orally present the pending notifications to the subscriber via the voice recognition application 138 and the speaker 133. Alternatively, the home assistant 104 and or the self-service client application 140 may be capable of recognizing the voice of the user of the mobile communication device 102 and deem the user is present when that user's voice is heard and present the pending notifications orally, even when neither the Bluetooth radio of the device 102 or the Wi-Fi radio of the device 102 is detected. It is understood that presentation of a notification may comprise initiating a dialog between the subscriber and the self-service client application 140, for example to invite the subscriber to initiate a transaction and to walk the subscriber through the different steps of the transaction that depend upon input from the subscriber.

In some cases, a transaction mediated by the self-service client application 140 may engage confidential information of a sensitive nature that it is undesirable to make available to other applications executing on the home assistant 104. The present disclosure teaches a virtual private mode (VPM) of operation of the home assistant 104. An application executing in background on the home assistant 104 that determines that it is responsible for handling a dialog with a subscriber may be enabled to execute in the foreground on the home assistant 104 and to command the voice recognition application 138 to channel the digital signal generated by the voice recognition application 138 by parsing the audio received from the microphone 132 exclusively to the subject application, for example exclusively to the self-service client application 140.

The self-service client application 140 may establish a traditional virtual private network (VPN) connection between the network interface 142 of the home assistant 104 to the self-service server application 110 to convey the confidential information to the self-service server application 110 securely. Alternatively, the self-service client application 140 may send the confidential information without using a VPN using some other secure channel or secure technique, such as sending the confidential information in an encrypted form. When the need to share confidential information is completed, the self-service client application 140 may command the VPN connection to be released and may command the discontinuation of the VPM operation, for example commanding the operating system or the voice recognition application 138 of the home assistant 104 to resume execution and/or sharing of digital signal information with other applications on the home assistant 104.

This VPM operation may be achieved in a variety of ways. The voice recognition application 138 or an operating system of the home assistant 104 may turn off all other applications executing on the home assistant 104, thereby preventing these other applications having access to the confidential information. Alternatively, the voice recognition application 138 may interrupt sharing of the digital signal derived by the voice recognition application 138 by parsing the audio received from the microphone 132 with an application other than the application granted exclusive access to that digital signal. In an embodiment, the VPM operation may use a trusted security zone. Trusted security zones may be conceptualized to provide trusted execution based on hardware assisted security. Trusted security zones are described further hereinafter.

The self-service client application 140 and other applications may be configured with a privilege for invoking the VPM operation. To qualify for this privilege, developers of the self-service client application 140 and other applications may have to subject their applications to a special test to assure they do not abuse the VPM operation and that they properly release the VPM privilege according to requirements placed upon them by the designer or manufacturer of the home assistant 104.

Figure 4:
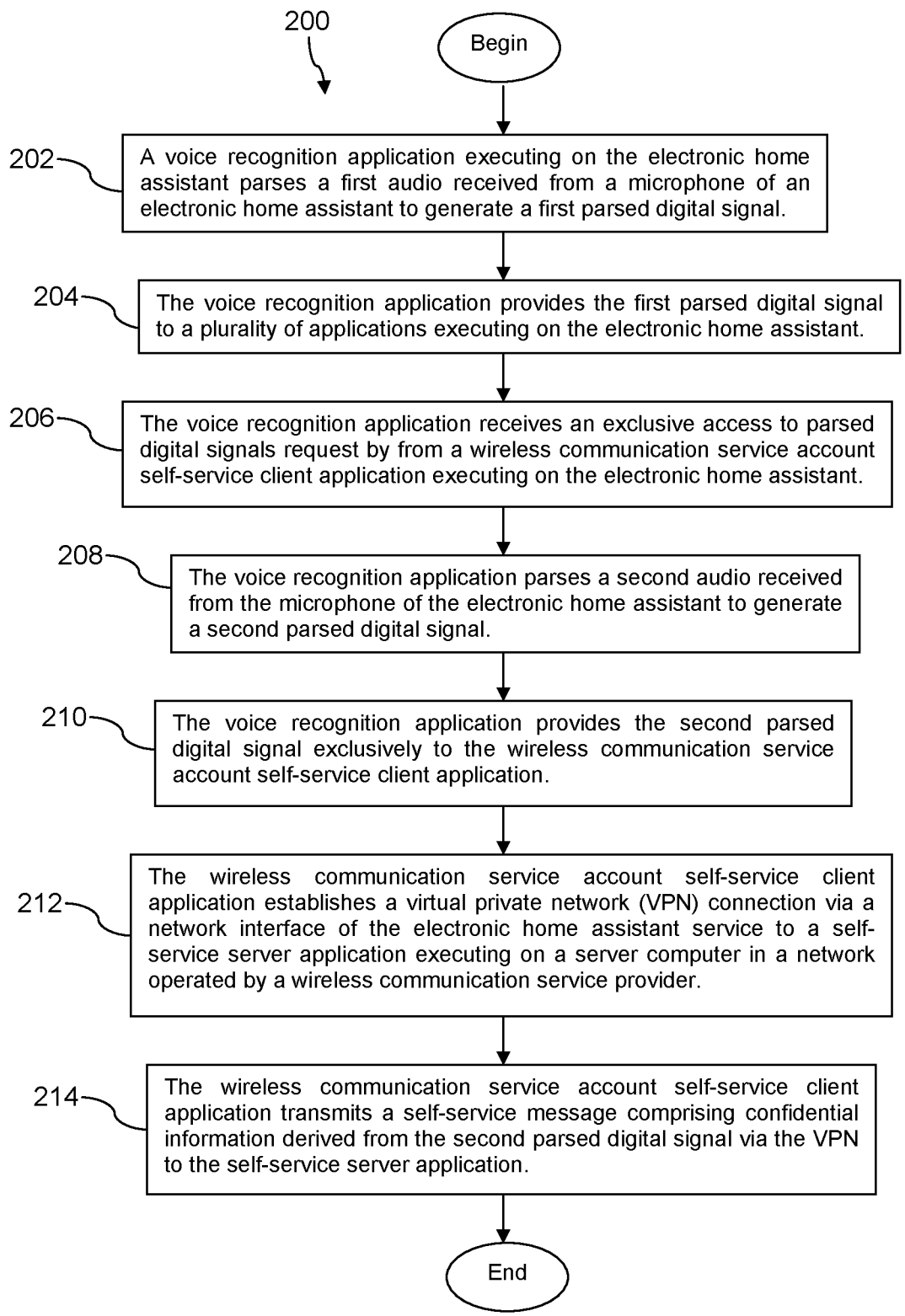
FIG. 4 is a flow chart of a method according to an embodiment of the disclosure.

Turning now to FIG. 4 a method 200 is described. At block 202, a voice recognition application executing on the electronic home assistant parses a first audio received from a microphone of an electronic home assistant to generate a first parsed digital signal. At block 204, the voice recognition application provides the first parsed digital signal to a plurality of applications executing on the electronic home assistant. At block 206, the voice recognition application receives an exclusive access to parsed digital signals request from a wireless communication service account self-service client application executing on the electronic home assistant.

At block 208, the voice recognition application parses a second audio received from the microphone of the electronic home assistant to generate a second parsed digital signal. At block 210, the voice recognition application provides the second parsed digital signal associated with the second audio exclusively to the wireless communication service account self-service client application. At block 212, the wireless communication service account self-service client application establishes a virtual private network (VPN) connection via a network interface of the electronic home assistant service to a self-service server application executing on a server computer in a network operated by a wireless communication service provider. At block 214, the wireless communication service account self-service client application transmits a self-service message comprising confidential information derived from the second parsed digital signal associated with the second audio via the VPN to the self-service server application.

While the description of method 200 describes the self-service client application 140 requesting exclusive access to parsed digital signals, it is understood that the "request for exclusive access to parsed digital signals" may be used by other applications, different from the self-service client application 140, and in this case the self-service client application 140 as well as all other applications, excepting the requesting application, would be denied access to the parsed digital signals. The applications that are allowed to request exclusive access to parsed digital signals may be restricted to privileged applications that have been installed by the original equipment manufacturer (OEM) of the home assistant or are otherwise deemed trusted for access to such a powerful command.

In an embodiment, the virtual private mode (VPM) of operation of the home assistant 104 described above with reference to FIG. 1 may be provided using a trusted security zone. A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Figure 5:
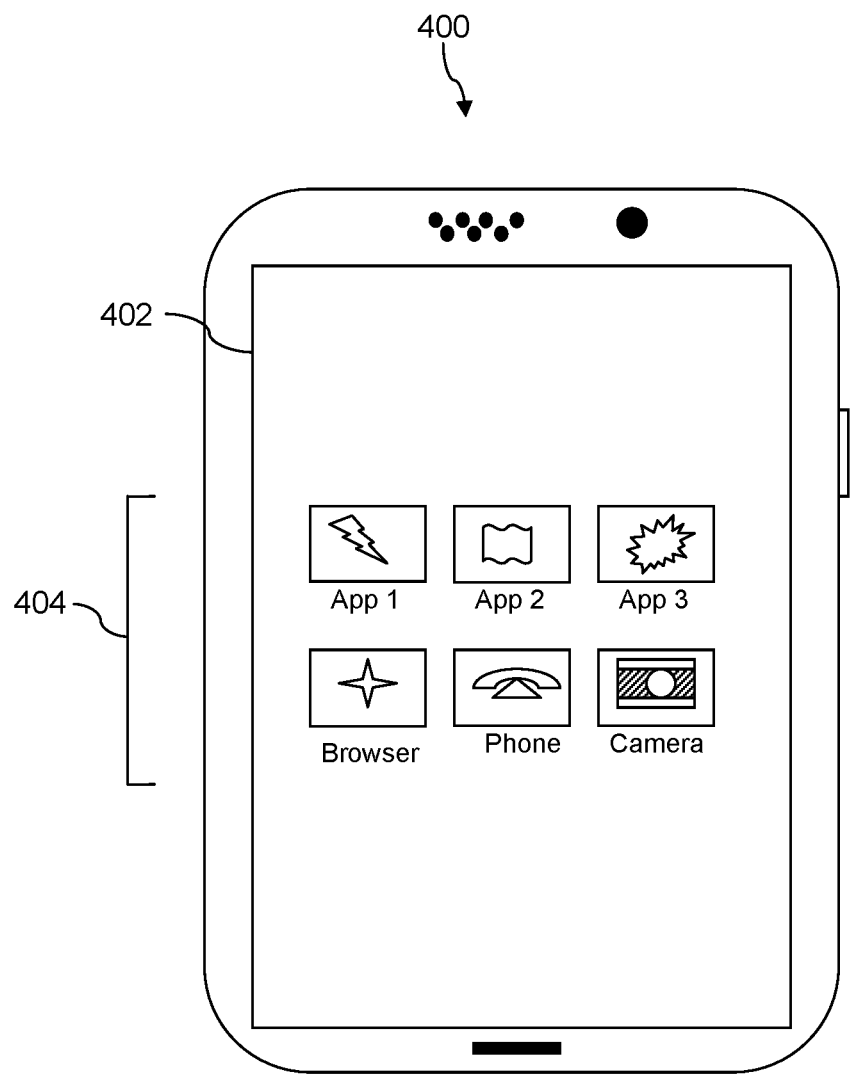
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
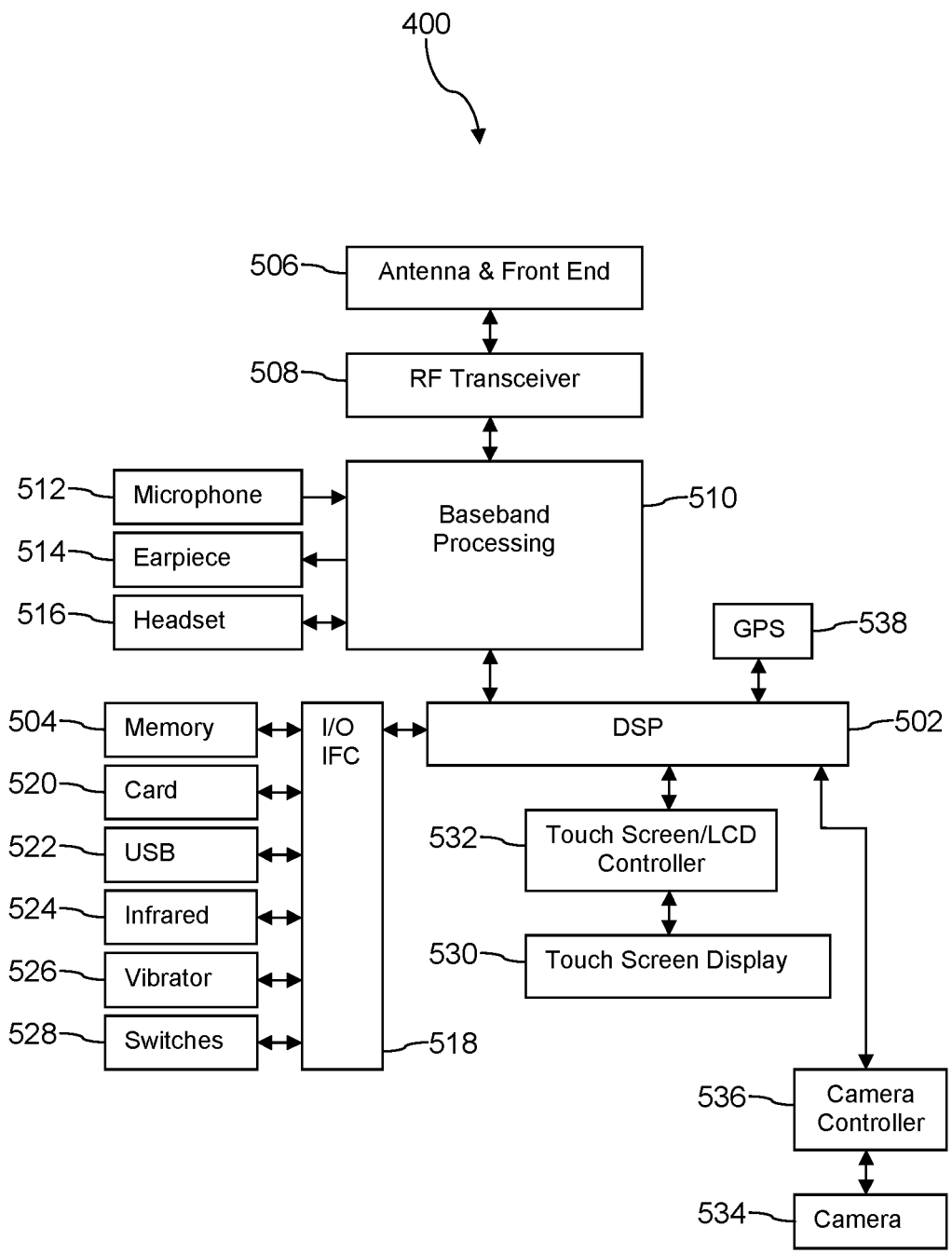
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
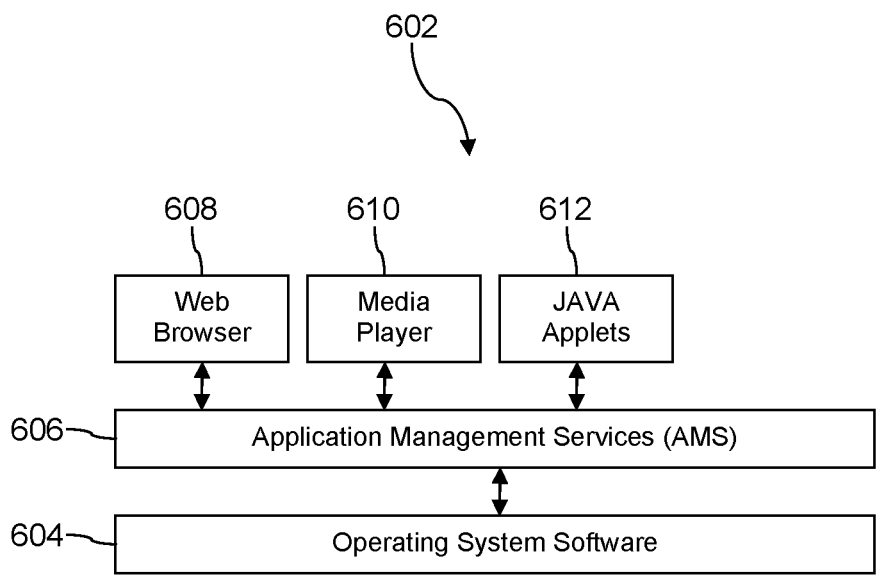
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
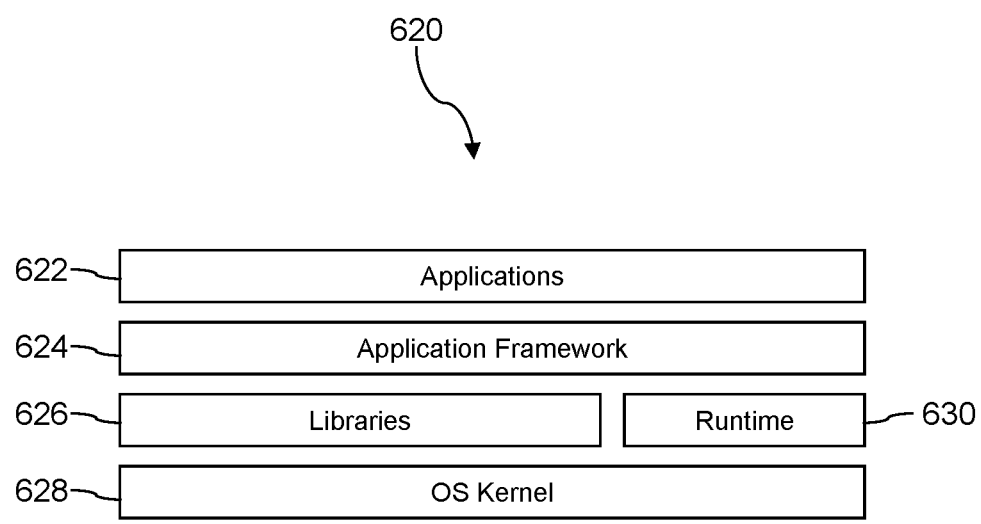
FIG. 7B is a block diagram of another software architecture of a mobile communication device according to an embodiment of the disclosure

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
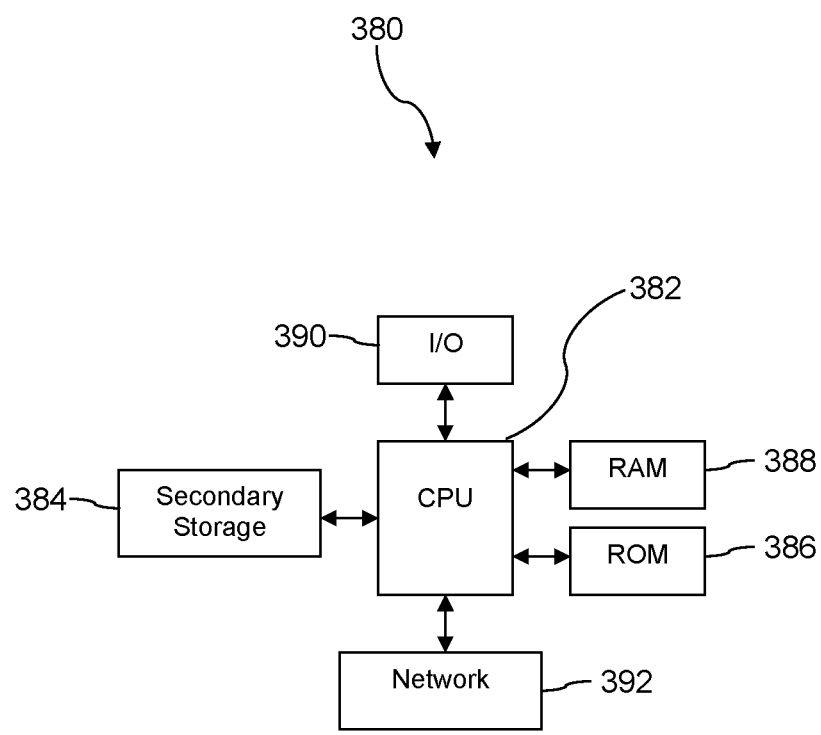
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic home assistant, comprising:
a processor;
a non-transitory memory;
a microphone;
a Bluetooth radio transceiver that receives a pairing request from a mobile communication device;
a network interface;
a voice recognition application stored in the non-transitory memory that, when executed by the processor, processes audio received from the microphone and parses the audio into a parsed digital signal; and
a self-service client application stored in the non-transitory memory that, when executed by the processor,
after the Bluetooth pairing request is received by the Bluetooth radio from the mobile communication device, determines an identity of the mobile communication device,
transmits a subscriber self-service registration request message comprising the identity of the mobile communication device via the network interface to a self-service server application executing on a server computer,
initiates a virtual private mode of the electronic home assistant that while active grants the self-service client application exclusive access to the parsed digital signal to the exclusion of other applications executing on the electronic home assistant,
receives the parsed digital signal from the voice recognition application that comprises a one-time use security token,
transmits the one-time use security token via the network interface to the self-service server application to register the mobile communication device with the self-service server application,
receives a bundle of notifications from the self-service server application via the network interface, where the bundle of notifications pertain to a wireless communication service account associated with the mobile communication device, and
causes the notifications to be audibly presented.

2. The electronic home assistant of claim 1, wherein the bundle of notifications further comprise a security token and the self-service client application further:
stores the security token in the non-transitory memory,
reads the security token from the non-transitory memory,
sends a request to establish a communication session with the self-service server application executing on the server computer via the network interface, where the request comprises the security token,
receives a second bundle of notifications from the self-service server application via the network interface, and
stores a second plurality of notifications received in the second bundle of notifications in the non-transitory memory.

3. The electronic home assistant of claim 2, wherein the self-service client application further:
stores a Bluetooth identity associated with the mobile communication device in the non-transitory memory with a reference to the identity of the mobile communication device,
detects the Bluetooth identity,
reads the Bluetooth identity associated to the identity of the mobile communication device from the non-transitory memory,
reads the second plurality of notifications stored in the non-transitory memory that are associated with the identity of the mobile communication device associated with the Bluetooth identity, and
causes the second plurality of notifications to be audibly presented.

4. The electronic home assistant of claim 3, wherein the self-service client application further:
determines a Wi-Fi identity associated with the mobile communication device,
adds the Wi-Fi identity to the association of the Bluetooth identity and the identity of the mobile communication device,
detects the Wi-Fi identity,
reads the Wi-Fi identity association to the Bluetooth identity and the identity of the mobile communication device,
reads a third plurality of notifications stored in the non-transitory memory that are associated to the identity of the mobile communication device associated with the Wi-Fi identity, and
causes the third plurality of notifications to be audibly presented.

5. The electronic home assistant of claim 4, wherein the self-service client application sends the request to establish the communication session with the self-service server application in response to detecting the Wi-Fi identity.

6. The electronic home assistant of claim 3, wherein the self-service client application sends the request to establish the communication session with the self-service server application in response to detecting the Bluetooth identity.

7. The electronic home assistant of claim 1, wherein the notifications comprise information about an overdue subscription account payment, information about an approaching payment deadline for subscription account payment, information about an approaching eligibility for device upgrade, a recommendation of an upgrade device that may be suitable to the subscribers communication and device use patterns, or an offer for a discounted price to initiate a new premium communication service on the mobile communication device.

8. A method of providing electronic home assistant service, comprising:
parsing a first audio received from a microphone of an electronic home assistant by a voice recognition application executing on the electronic home assistant to generate a first parsed digital signal;
providing the first parsed digital signal by the voice recognition application to a plurality of applications executing on the electronic home assistant;
receiving an exclusive access to parsed digital signals request by the voice recognition application from a wireless communication service account self-service client application executing on the electronic home assistant;
initiating a virtual private mode of the electronic home assistant that while active grants the wireless communication service account self-service client application exclusive access to the parsed digital signal to the exclusion of other applications executing on the electronic home assistant;
parsing a second audio received from the microphone of the electronic home assistant by the voice recognition application to generate a second parsed digital signal, wherein the second parsed digital signal comprises a one-time use security token, transmits the one-time use security token via the network interface to the self-service server application, to register the mobile communication device with the self-service server application;

providing the second parsed digital signal by the voice recognition application exclusively to the wireless communication service account self-service client application;

establishing a virtual private network (VPN) connection by the wireless communication service account self-service client application via a network interface of the electronic home assistant service to a self-service server application executing on a server computer in a network operated by a wireless communication service provider; and transmitting a self-service message comprising the one-time use security token to register the mobile communication device with the self-service server application and confidential information derived from the second parsed digital signal by the wireless communication service account self-service client application via the VPN to the self-service server application.

9. The method of claim 8, wherein the plurality of applications other than the self-service client application are one of turned off or suspended from execution while the wireless communication service account self-service client application is granted exclusive access to the parsed digital signals by the voice recognition application.

10. The method of claim 8, wherein the wireless communication service account self-service client executes in a trusted security zone of a processor of the electronic home assistant while it is granted exclusive access to the parsed digital signals by the voice recognition application.

11. The method of claim 8, wherein the wireless communication service account self-service client application provides subscriber services associated with a mobile communication device.

12. The method of claim 11, wherein the mobile communication device is one of a mobile phone, a smart phone, a personal digital assistant (PDA), a wearable computer, a headset computer, a media player, a laptop computer, a notebook computer, or a tablet computer.

13. The method of claim 11, further comprising receiving financial information from a near field communication (NFC) radio transceiver of the mobile communication device by a NFC radio transceiver of the electronic home assistant, wherein the confidential information derived from the parsed words is a personal identification number (PIN) associated with the financial information received from the NFC radio transceiver of the mobile communication device and wherein the transmitted self-service message further comprises the financial information.

14. The method of claim 8, wherein the confidential information comprises credit card information.

15. An electronic home assistant, comprising:
a processor;
a non-transitory memory;
a microphone;
a Bluetooth radio transceiver that receives a pairing request from a mobile communication device;
a network interface;
a voice recognition application stored in the non-transitory memory that, when executed by the processor, processes audio received from the microphone and parses the audio into a parsed digital signal; and a self-service client application stored in the non-transitory memory that, when executed by the processor,
after the Bluetooth pairing request is received by the Bluetooth radio from the mobile communication device, determines an identity of the mobile communication device,
transmits a subscriber self-service registration request message comprising the identity of the mobile communication device via the network interface to a self-service server application executing on a server computer,
initiates a virtual private mode of the electronic home assistant that while active grants the self-service client application exclusive access to the parsed digital signal to the exclusion of other applications executing on the electronic home assistant,
receives a first parsed digital signal from the voice recognition application that comprises a one-time use security token,
transmits the one-time use security token via the network interface to the self-service server application, to register the mobile communication device with the self-service server application,
receives a security token and a bundle of notifications from the self-service server application via the network interface, where the bundle of notifications pertain to a wireless communication service account associated with the mobile communication device,
causes the notifications to be audibly presented,
stores an association between the security token, the identity of the mobile communication device, and an identity of a Bluetooth radio transceiver of the mobile communication device in the non-transitory memory,
determines that the Bluetooth radio transceiver has re-paired with the Bluetooth radio transceiver of the mobile communication device, based on the identity of the Bluetooth radio transceiver of the mobile communication device, reads the security token from the non-transitory memory,
after reading the security token from the non-transitory memory, transmits a notification request message comprising the security token to the self-service server application,
receives a second bundle of notifications from the self-service server application via the network interface, and
causes notifications received in the second bundle of notifications to be audibly presented.

16. The electronic home assistant of claim 15, where the Bluetooth radio transceiver receives a second Bluetooth pairing request from a second mobile communication device and where the self-service client application further:
after the second Bluetooth pairing request is received by the Bluetooth radio from the second mobile communication device, determines an identity of the second mobile communication device,
transmits a second subscriber self-service registration request message comprising the identity of the second mobile communication device via the network interface to the self-service server application,
receives a second parsed digital signal from the voice recognition application that comprises a second one-time use security token,
transmits the second one-time use security token via the network interface to the self-service server application, whereby the self-service client application registers the second mobile communication device with the self-service server application, receives a second security token and a third bundle of notifications from the self-service server application via the network interface, where the third bundle of notifications pertain to a wireless communication service account associated with the second mobile communication device, causes the notifications in the third bundle of notifications to be audibly presented, and stores an association between the second security token, the identity of the second mobile communication device, and an identity of a second Bluetooth radio transceiver of the second mobile communication device in the non-transitory memory.

17. The electronic home assistant of claim 15, where the self-service client application transmits the notification request message comprising the security token to the self-service server application periodically.

18. The electronic home assistant of claim 17, where the self-service client application transmits the notification request message comprising the security token to the self-service server application daily.

19. The electronic home assistant of claim 17, where the self-service client application transmits the notification request message comprising the security token to the self-service server application weekly.

20. The electronic home assistant of claim 15, where the mobile communication device is one of a mobile phone, a smart phone, a personal digital assistant (PDA), a wearable computer, a headset computer, a media player, a laptop computer, a notebook computer, or a tablet computer.

* * * * *